United States Patent
Lee et al.

(10) Patent No.: US 10,726,541 B2
(45) Date of Patent: Jul. 28, 2020

(54) INSPECTION APPARATUS FOR DETECTING DEFECTS IN PHOTOMASKS AND DIES

(71) Applicant: SAMSUNG ELECTRONICS CO., LTD., Suwon-si, Gyeonggi-Do (KR)

(72) Inventors: Kang Won Lee, Hwaseong-si (KR); Cheol Ki Min, Seoul (KR); Jong Ju Park, Hwaseong-si (KR); Hyon Seok Song, Suwon-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 108 days.

(21) Appl. No.: 16/013,417

(22) Filed: Jun. 20, 2018

(65) Prior Publication Data
US 2019/0139209 A1 May 9, 2019

(30) Foreign Application Priority Data
Nov. 3, 2017 (KR) .................. 10-2017-0146122

(51) Int. Cl.
*G06T 7/00* (2017.01)
*G06K 9/62* (2006.01)
(Continued)

(52) U.S. Cl.
CPC ............ *G06T 7/001* (2013.01); *G06K 9/4652* (2013.01); *G06K 9/6202* (2013.01); *G06T 7/337* (2017.01);
(Continued)

(58) Field of Classification Search
CPC ....... G06T 7/33; G06K 9/4652; G06K 9/6202
See application file for complete search history.

(56) References Cited

U.S. PATENT DOCUMENTS 5,153,678 A   10/1992  Ota
5,656,402 A    8/1997  Kasuga
(Continued)

FOREIGN PATENT DOCUMENTS

JP   08-330214   12/1996
JP    9-229625    9/1997
(Continued)

OTHER PUBLICATIONS

Mark Pereira, et al., "Parallelized Automatic False Defect Detection Using GPUs During Mask Inspection," Proceeding of SPIE, vol. 8166, pp. 81662Z1-81662Z9.
(Continued)

*Primary Examiner* — Edward Park
(74) *Attorney, Agent, or Firm* — F. Chau & Associates, LLC (57) ABSTRACT

A defect inspecting apparatus includes a reference image generator configured to generate a first reference image and a second reference image from design layout data. An image inspector is configured to obtain a first inspection image of a first inspection region of a photomask and a second inspection image of a second inspection region of the photomask. An operation processor is configured to extract a first coordinate offset by comparing the first inspection image with the first reference image and to extract a second coordinate offset by comparing the second inspection image with the second reference image.

9 Claims, 6 Drawing Sheets

(51) Int. Cl.
*G06K 9/46* (2006.01)
*G06T 7/33* (2017.01)

(52) U.S. Cl.
CPC ...... *G06T 7/97* (2017.01); *G06T 2207/30148* (2013.01)

(56) References Cited

U.S. PATENT DOCUMENTS

| | | |
|---|---|---|
| 8,204,296 B2 | 6/2012 | Bhaskar et al. |
| 9,087,367 B2 | 7/2015 | Chang et al. |
| 9,401,014 B2 | 7/2016 | Zafar et al. |
| 2003/0048939 A1 | 3/2003 | Lehman |
| 2004/0232332 A1* | 11/2004 | Konno .......... H01J 37/265 250/310 |
| 2007/0280527 A1* | 12/2007 | Almogy .......... G03F 7/70491 382/149 |
| 2011/0170091 A1 | 7/2011 | Chang et al. |
| 2013/0223763 A1* | 8/2013 | Lin .......... G06K 9/6204 382/294 |
| 2016/0247680 A1 | 8/2016 | Fang et al. |

FOREIGN PATENT DOCUMENTS

| | | |
|---|---|---|
| JP | 2822229 | 9/1998 |
| JP | 3273049 | 1/2002 |
| JP | 3347130 | 9/2002 |
| JP | 5792431 | 8/2015 |
| KR | 10-2004-0066964 | 7/2004 |
| KR | 10-2012-0125273 | 11/2012 |

OTHER PUBLICATIONS

AIMS EUV MS4_technical meeting handout, Steinheim, Dec. 8/9, 2010.

* cited by examiner

INSPECTION APPARATUS FOR DETECTING DEFECTS IN PHOTOMASKS AND DIES

CROSS-REFERENCE TO RELATED APPLICATION

This application claims priority under 35 U.S.C. § 119 to Korean Patent Application No. 10-2017-0146122 filed on Nov. 3, 2017 in the Korean Intellectual Property Office, the disclosure of which is herein incorporated by reference in its entirety.

TECHNICAL FIELD

The present inventive concept relates to defect detection and, more specifically, to an inspection apparatus for detecting defects in photomasks and dies.

DISCUSSION OF RELATED ART

Design rule checking is a process by which automated hardware is used to verify that the physical layout of a photomask or integrated circuit satisfies various constrains, which are referred to as design rules. As microchips become more highly integrated and the size of circuit features thereon continues to shrink, the design rules specify ever tighter constraints. Additionally, as microchips become more highly integrated, the size of the photomask patterns used to pattern semiconductor devices have also been reduced. As such, as the size of the mask pattern is reduced, the time required for performing design rule checking has increased.

SUMMARY

A defect inspecting apparatus includes a reference image generator configured to generate a first reference image and a second reference image from design layout data. An image inspector is configured to obtain a first inspection image of a first inspection region of a photomask and a second inspection image of a second inspection region of the photomask. operation processor is configured to extract a first coordinate offset by comparing the first inspection image with the first reference image and to extract a second coordinate offset by comparing the second inspection image with the second reference image.

A method of inspecting a defect in an inspection object includes generating a first reference image and a second reference image from design layout data pertaining to the inspection object. A first inspection image and a second inspection image of the inspection object are obtained. A first coordinate offset is extracted by comparing the first inspection image with the first reference image. A second coordinate offset is extracted by comparing the second inspection image with the second reference image. The first inspection image is compared with the second inspection image in a die-to-die manner using the first coordinate offset and the second coordinate offset. It is determined whether a defect is present in the second inspection image based on the comparison of the first and second inspection images.

A method of inspecting a photomask for defects includes generating a first reference image and a second reference image from design layout data of the photomask. A first inspection image of a first inspection region of the photomask is obtained by directing light onto the photomask. A second inspection image of a second inspection region of the photomask is obtained by directing light onto the photomask. A first coordinate offset I extracted by comparing the first inspection image with the first reference image. A second coordinate offset is extracted by comparing the second inspection image with the second reference image. The first reference image and the second reference image each include pixels smaller than pixels of the first inspection image and the second inspection image.

BRIEF DESCRIPTION OF DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION

In describing exemplary embodiments of the present disclosure illustrated in the drawings, specific terminology is employed for sake of clarity. However, the present disclosure is not intended to be limited to the specific terminology so selected, and it is to he understood that each specific element includes all technical equivalents which operate in a similar manner.

Figure 1:
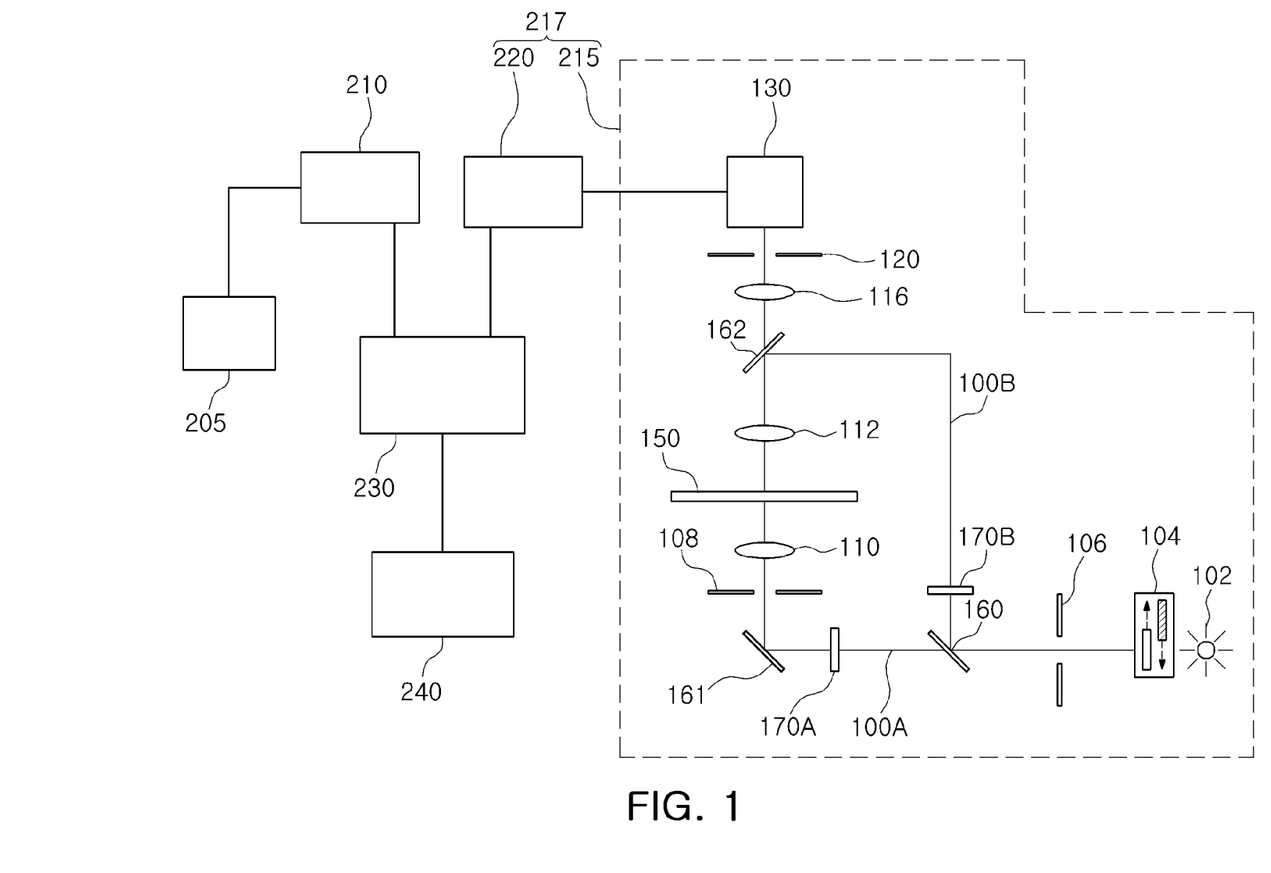
FIG. 1 is a schematic view illustrating a defect inspecting device according to an exemplary embodiment of the present disclosure.

FIG. 1 is a schematic diagram illustrating a defect inspecting device according to an exemplary embodiment of the present disclosure.

With reference to FIG. 1, the defect inspecting device may include a storage device 205, a reference image generator 210, an inspection image generator 215, an inspection image processor 220, an operation processor 230, and a display device 240. The inspection image generator 215 and the inspection image processor 220 may constitute an image inspector 217.

The inspection image generator 215 may include a light source 102, such as extreme ultraviolet (EUV), deep ultraviolet (DUV), or an i-line light source, and may include a light splitter 160 diving light from the light source 102 into a transmitted light path 100A and a reflected light path 100B. A filter 104 including a filter suitable for a wavelength of light emitted from the light source 102 and an illumination aperture 106 for adjusting numerical aperture (NA) and coherency of the light emitted from the light source 102. Both the illumination aperture 106 and the filter 104 may be disposed between the light source 102 and the light splitter 160.

In addition, ON/OFF shutters 170A and 170B, may be configured to block or pass light transmitted on the transmitted light path 100A and the reflected light path 100B. The ON/OFF shutters 170A and 170B may be disposed on the transmitted light path 100A and the reflected light path 100B, respectively. Thus, light transmitted on the transmitted light path 100A and the reflected light path 100B may be blocked or may travel according to an ON/OFF state of the ON/OFF shutters 170A and 170B. Therefore, an image may be selectively acquired using either transmitted light or reflected light. For example, the transmitted light may be used to inspect photomasks while the reflected light may be used to inspect integrated circuits, or vice versa.

A condensing lens 110 is configured to condense light having been reflected by a reflector 161 and having passed through a lower aperture 108 so that the light may be transmitted to a first surface of a photomask 150. The condensing lens 110 may be disposed on the transmitted light path 100A. The first surface of the photomask 150 is the surface on Which mask patterns are not disposed. Light transmitted along the reflected light path 100B may be directed onto a second surface of the photomask 150 after being reflected by the reflector 162. The second surface refers to a surface of the photomask 105 on which the mask patterns are disposed. The first surface and the second surface are opposite sides of the photomask 105. Reflected light directed to the second surface of the photomask 150 along the reflected light path 100B and transmitted light transmitted through the photomask 150 along the transmitted light path 100A may be transmitted to an optical sensor 130 through an objective lens 112, a magnification projection lens 116, and an upper aperture 120. Therefore, transmitted light travels along the transmitted light path 100A to pass through the photomask 150 and be incident on the optical sensor 160 and reflected light travels along the reflected light path 100B to be reflected from the surface of the photomask 150 and be incident on the optical sensor 130. The optical sensor 130 may be provided as a time delay integration (TDI) sensor having a plurality of pixels (e.g., 1024×2048 pixels). The photomask 150 may be mounted on a table and the optical sensor 130 may scan inspection regions of the photomask 150, while the table is moved.

The inspection image processor unit 220 may convert light received by the optical sensor 130 into an electrical signal to form inspection images of the inspection regions (including a first inspection image of a first inspection region, a second inspection image of a second inspection region, or the like). Image information of the inspection images may be transmitted to the operation processor 230.

The reference image generator 210 may read design layout data stored in the storage device 205 to generate reference images (including a first reference image, a second reference image, or the like) used in a simulation-based inspection process. Image information of the reference images may be transmitted to the operation processor 230. The reference images may include pixels smaller than those of the inspection images.

The operation processor 230 may extract a first coordinate offset by comparing the first inspection image with the first reference image and may extract a second coordinate offset by comparing the second inspection image with the second reference image. The operation processor 230 may calculate an alignment offset between the first inspection image and the second inspection image using the first coordinate offset and the second coordinate offset. The operation processor 230 may align the first inspection image and the second inspection image to be offset by the alignment offset extracted from the first coordinate offset and the second coordinate offset and may then compare the first inspection image with the second inspection image in a die-to-die manner. The operation processor 230 may extract a gray level difference value from gray level data of the first inspection image and of the second inspection image and compare the gray level difference value with a predetermined threshold value, thereby determining whether a defect is present in the second inspection region. For example, if the gray level difference value is greater than the predetermined threshold value then it may be determined that a defect is present. The operation processor 230 may include at least one microprocessor to compare images described above and detect a defect. The operation processor 230 may further include a data storage device to store the images, offset values described above, defect inspection results, and the like.

The display device 240 may display images formed by the reference image generator 210 and the inspection image generator 215 or information obtained in the operation processor 230. An inspection object to he inspected by a defect inspecting device is not limited to a photomask. The inspection object may be an integrated circuit such as a wafer having circuit patterns formed thereon. In this case, the defect inspecting device may use inspection images by reflected light.

Figure 2:
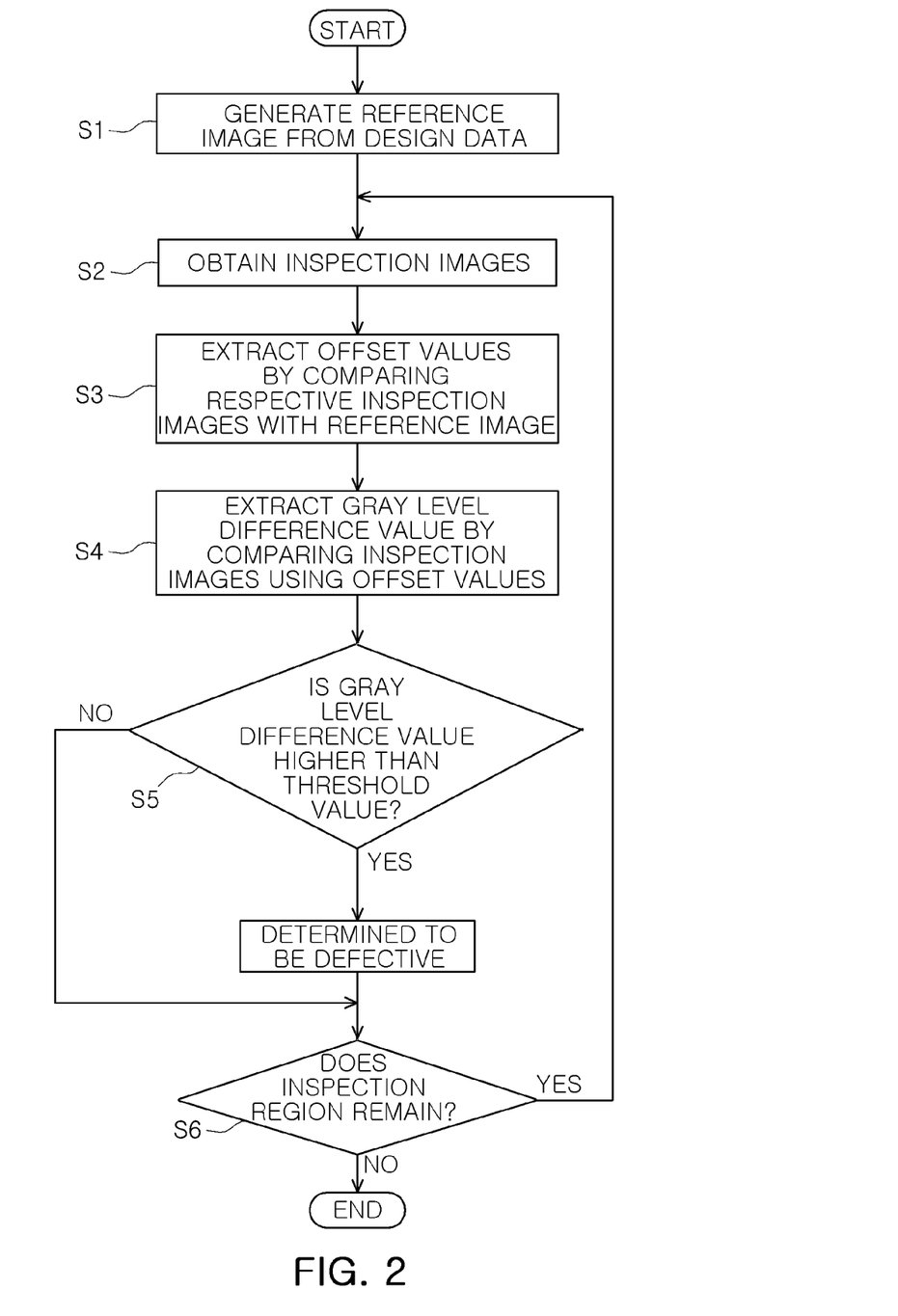
FIG. 2 is a flowchart illustrating a method of inspecting a defect according to an exemplary embodiment of the present disclosure.

FIG. 2 is a flowchart illustrating a method of inspecting a defect according to an exemplary embodiment of the present invention. In this method, rather than performing direct die-to-die image comparison, exemplary embodiments of the present invention first perform a comparison of each die image with a reference image so that offset values may he calculated. Then, in performing image comparison, the offset values are used to ensure the comparison is well aligned. This approach has a distinct advantage over approaches of the related art in that without the use of offset values, images may he slightly misaligned during die-to-die image comparison, and this slight misalignment may alter gray level value comparison and lead to the rejection of good dies and masks as defective. Accordingly, exemplary embodiments of the present invention have the advantage of greater manufacturing yield as fewer good dies and masks are rejected as defective.

With reference to FIG. 1 the method of inspecting a defect may comprise generating reference images (including a first reference image, a second reference image, or the like) from design layout data in S1, obtaining inspection images (including a first inspection image, a second inspection image, or the like) from an inspection object in S2, extracting a first coordinate offset by comparing the first inspection image with the first reference image and extracting the second coordinate offset by comparing the second inspection image with the second reference image in S3, comparing the first inspection image with the second inspection. image in a die-to-die manner using the first coordinate offset and the second coordinate offset in S4, and determining whether a defect is present in the second inspection image in S5. In addition, the method of inspecting a defect may further include determining whether an inspection region remains to be inspected in S6. In a case in which the inspection region remains to he inspected, operations may be performed again from the obtaining inspection images in S2, but this time, using the next inspection region.

The generating of the reference images in S1 may include generating a first reference die image corresponding to a single die using a simulation process after reading the design layout data and may include generating a second reference die image by aligning the same image as the first reference die image at a predetermined pitch (a pitch between dies extracted from the design layout data). The first reference image may be provided as an image in which the first reference die image is divided into a predetermined unit (e.g., a patch unit to be subsequently described). In the same manner as a case described above, the second reference image may be provided as an image in which the second reference die image is divided into a predetermined unit (e.g., a patch unit to be subsequently described). The first reference image and the second reference image correspond to the same region in the first reference die image and the second reference die image, respectively, but differ only in terms of coordinates. The first reference image and the second reference image may include pixels smaller than those of the first inspection image and the second inspection image. For example, the first reference image and the second reference image may each include pixels of several nanometers or less (e.g., 1 nm), while the first inspection image and the second inspection image may each include pixels of tens of nanometers (e.g., 72 nm).

The obtaining inspection images (including the first inspection image, the second inspection image, or the like) in S2 may comprise mounting a photomask including a first die and a second die disposed adjacent to the first die in the inspection image generator 215; aligning the photomask; and directing light onto the photomask (e.g. directing light onto the first die; and directing light onto the second die).

According to an exemplary embodiment of the present invention, the above steps may be automated under the control of the operation processor 230. The operation processor 230 may execute an algorithm in the performance of the above steps. For example, an algorithm for inspecting defects may include the steps of generating a reference image, obtaining inspection images, extracting offset values, extracting gray level difference values, determining if the difference values are within the threshold and determining whether the inspected object is defective, as shown in FIG. 2 and described in detail above.

Figure 3:
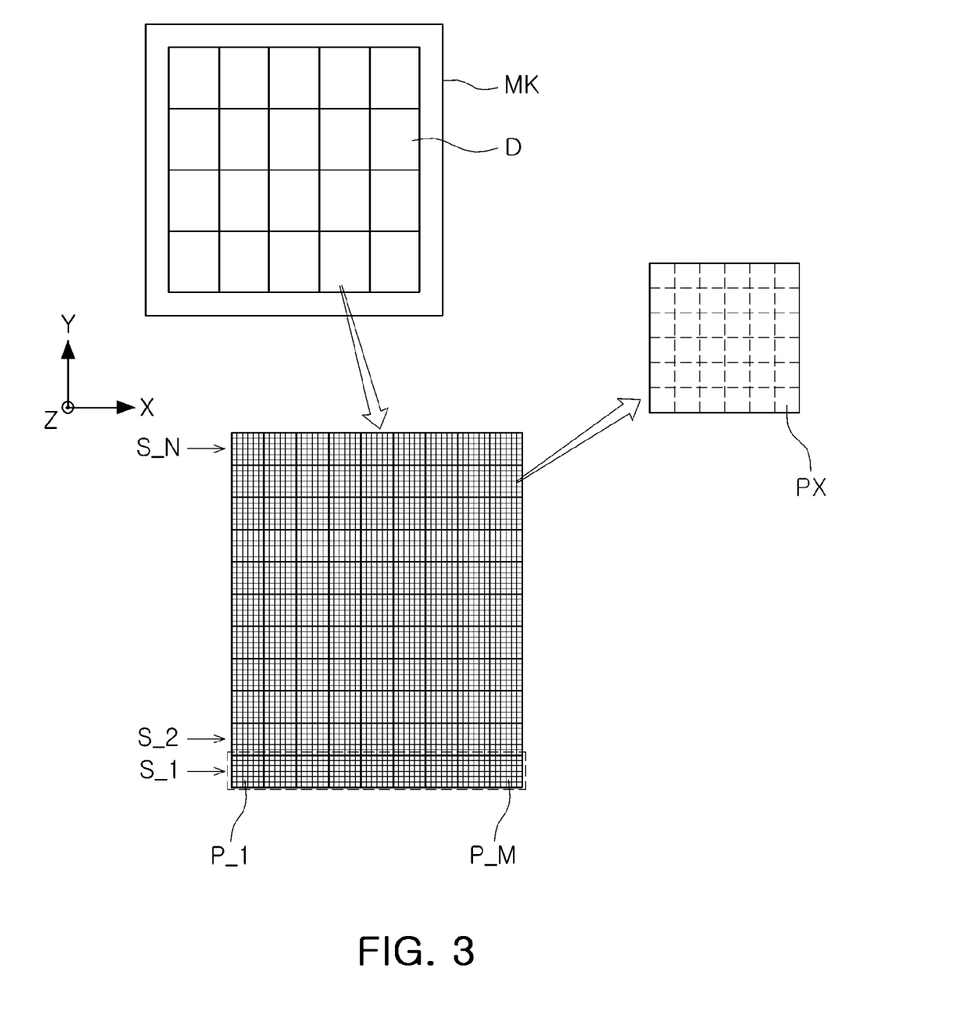
FIG. 3 is a view illustrating an inspection region of a photomask inspected by a defect inspecting device according to an exemplary embodiment of the present disclosure.

With reference to FIG. 3, the step of obtaining inspection images (including the first inspection image, the second inspection image, or the like) will be described in greater detail. A photomask MK may include a plurality of die patterns. A die is an integrated circuit, also referred to as a microchip or simply as a chip. Each of the die patterns of the photomask may occupy a rectangular region on the photomask and so the photomask may comprise a plurality of such rectangular regions. A rectangular region of the photomask, described above, may be referred to as a 'swath'. The dies may include a plurality of swaths S_1 to S_N. In addition, a plurality of inspection units may he defined within each swath. The inspection unit may be referred to as a 'patch'. The swath may include a plurality of patches P_1 to P_M. Respective swaths S_1 to S_N may have a rectangular shape that is longer in an X direction (or a Y direction) and may be aligned substantially in the Y direction (or the X direction). A size of respective patches P_1 to P_M may correspond to a size of a TDI sensor. An inspection image of respective patches P_1 to P_M may include a plurality of pixels PX.

An inspection image of the photomask MK may be captured by an inspection image generator 215. The inspection image of the photomask (MK) may be captured in each swath. When an inspection image of each die is captured, an operation of a table on which the photomask MK is mounted may be controlled so that respective swaths S_1 to S_N may be continuously and successively scanned. While the table is moved in the X direction or the Y direction, a first swath S_1, a second swath S_2, . . . and an Nth swath S_N may be sequentially captured. Inspection images of all dies of the photomask MK may be captured using the same process.

The inspection image processor 220 may process an inspection image, having been captured, and may transmit image information of the inspection image to the operation processor 230.

The operation processor 230 may be responsible for extracting a first coordinate offset by comparing the first inspection image with the first reference image and extracting a second coordinate offset by comparing the second inspection image with the second reference image in S3. the operation processor 230 may further be responsible for comparing the first inspection image with the second inspection image in a die-to-die manner using the first coordinate offset and the second coordinate offset in S4. The first inspection image and the second inspection image may be provided as images divided into patch units. The images divided into the patch. units may be referred to as a patch inspection image. For example, the first inspection image may be provided as a first patch inspection image obtained from a region of the first die, while the second inspection image may be provided as a second patch inspection image obtained from a region of the second die. The first reference image and the second reference image may also be provided as images divided into patch units among reference images generated by simulation.

Figure 4A:
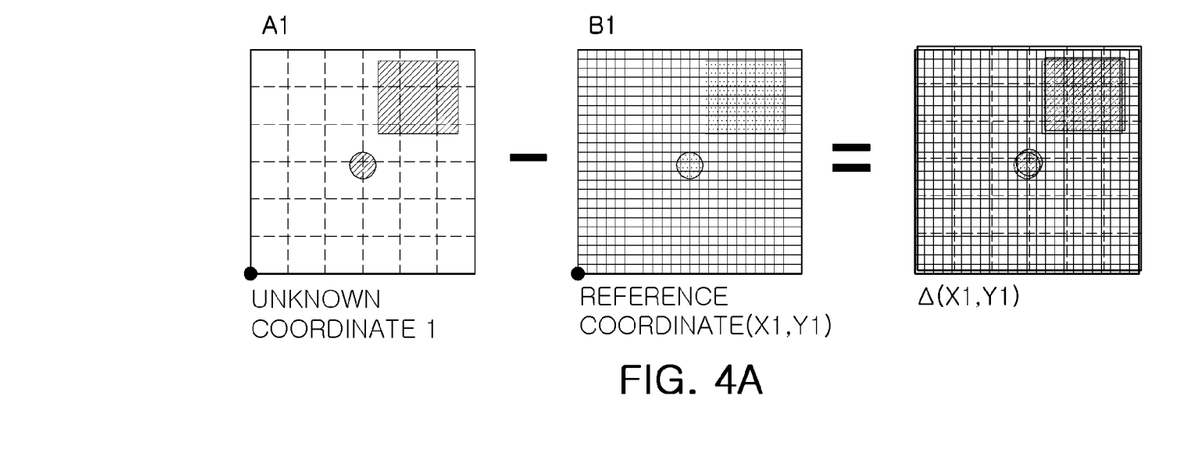
FIGS. 4A, 4B, 5A and 5B are views illustrating operations of a method of inspecting defect according to an exemplary embodiment of the present disclosure.
Figure 4B:
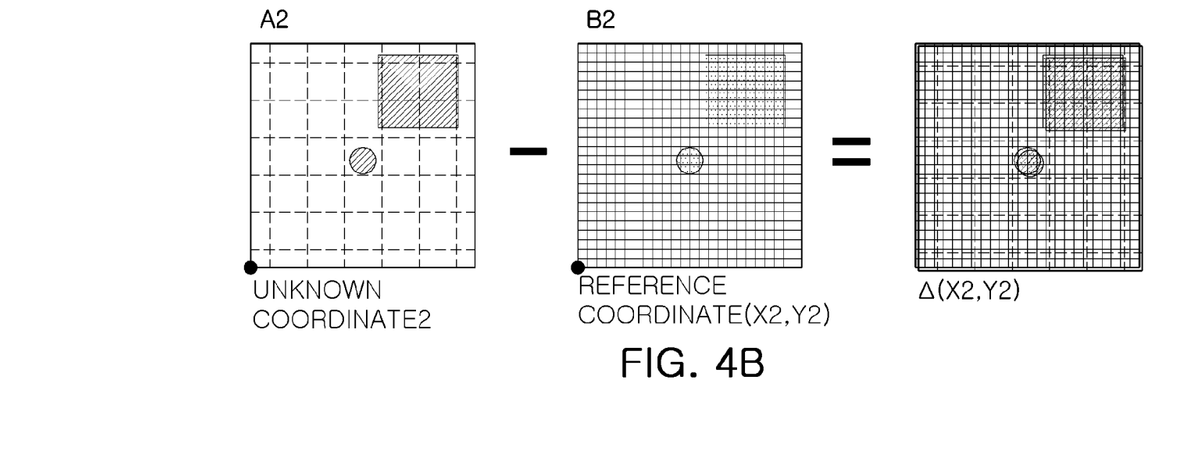

With reference to FIGS. 4A and 4B, the extracting of a first coordinate offset by comparing the first inspection image with the first reference image and the extracting of a second coordinate offset by comparing the second inspection image with the second reference image in S3 will he described in greater detail below.

With reference FIG. 4A, extracting a first coordinate offset $\Delta(X1, Y1)$ by comparing a first inspection image A1 with a first reference image B1 may include aligning the first inspection image A1 and the first reference image Bi to allow the gray level difference value to be a minimum. A distance between a first vertex disposed on a bottom left of the first inspection image A1 and a first reference vertex with reference coordinate (X1, Y1) disposed on a bottom left of the first reference image B1 in the X direction and the Y direction may also he determined.

With reference to FIG. 4B, extracting a second coordinate offset $\Delta(X2, Y2)$ by comparing a second inspection image A2 with a second reference image B2 may include aligning the second inspection image A2 and the second reference image B2 to allow the gray level. difference value to be a minimum. A distance between a second vertex disposed on a bottom left of the second inspection image A2 and a second reference vertex with reference coordinate (X2, Y2) disposed on a bottom left of the second reference image B2 in the X direction and the Y direction may also be determined.

The first coordinate offset and the second coordinate offset may be different from each other.

Figure 5A:
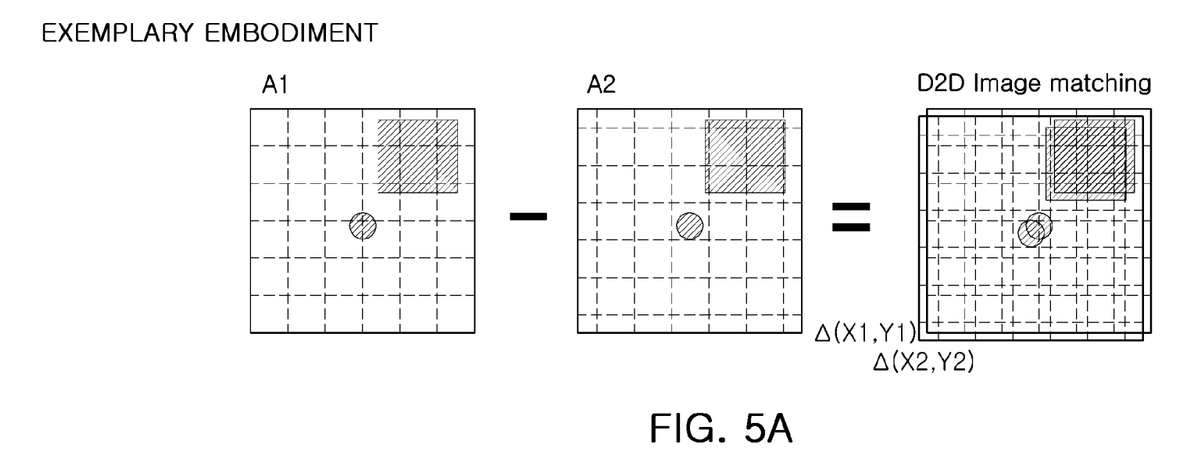
Figure 5B:
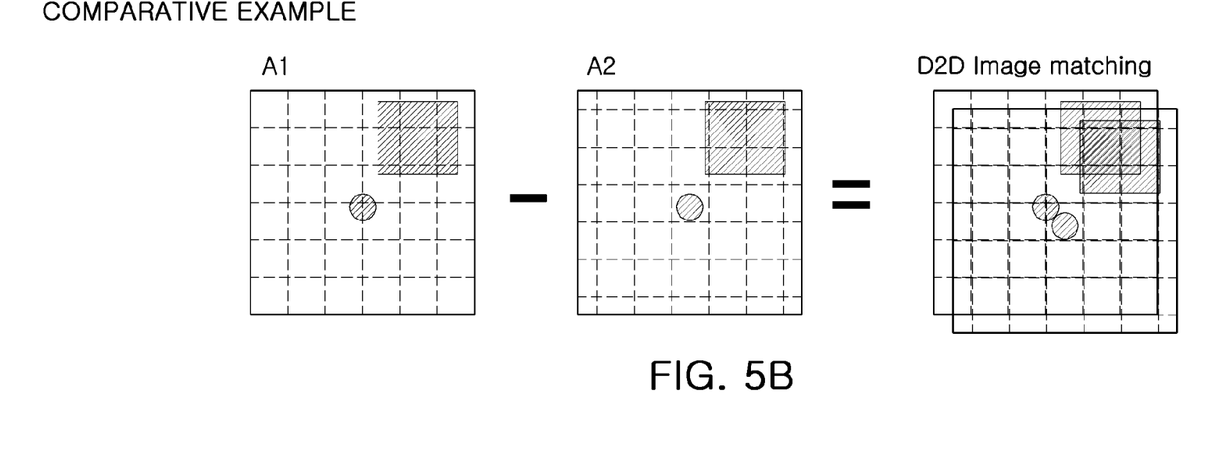

With reference to FIGS. 5A and 5B, the comparing the first inspection image with the second inspection image in a die-to-die manner using the first coordinate offset and the second coordinate offset in S4 will he described in detail below.

With reference to FIG. 5A, according to an exemplary embodiment of the present disclosure, the operation processor 230 may calculate an alignment offset between the first inspection image A1 and the second inspection image A2 using the first coordinate offset $\Delta(X1, Y1)$ and the second coordinate offset $\Delta(X2, Y2)$. The operation processor 230 may align the first inspection image A1 and the second inspection image A2 to he offset by an alignment offset extracted from the first coordinate offset $\Delta(X1, Y1)$ and the second coordinate offset Δ(X2, Y2). Since the alignment offset may be less than a pixel size of a reference image, an alignment error may be reduced to, for example, several nanometers or less.

After the first inspection image and the second inspection image are aligned, the gray level difference value may be extracted from gray level data of the first inspection image and of the second inspection image. According to an exemplary embodiment of the present disclosure, dispersion of an extracted gray level difference value may also be reduced.

With reference to FIG. 5B, in a comparative example, since the first inspection image and the second inspection image may be directly aligned, an alignment error similar to a pixel size of an inspection image or less (e.g., tens of nanometers or less) may occur.

In a case in which the first inspection image and the second inspection image are directly aligned, as in the comparative example, when the pixel size of the inspection image is reduced, the alignment error may be reduced to some extent. However, a time needed to obtain the image and an operational time of the inspection image may be increased, thereby degrading throughput of an inspection device. In this way, exemplary embodiments of the present invention have an advantage over the comparative example in terms of the time needed to perform the inspection.

However, according to an exemplary embodiment of the present disclosure, the alignment error may be significantly improved without degradation of the throughput of the inspection device, thereby providing advantages of greater efficiency and greater quality.

In the determining whether a defect is present in the second inspection image in S5, the gray level difference value may be compared with a predetermined threshold value, thereby determining whether a defect is present in the second inspection region.

Figure 6:
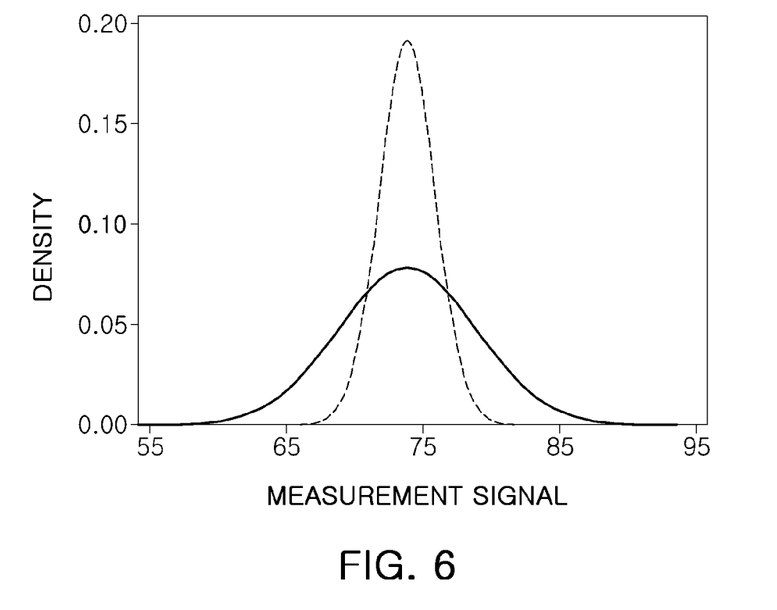
FIG. 6 is a graph illustrating an effect of an exemplary embodiment of the present disclosure.

FIG. 6 is a graph illustrating an effect of an exemplary embodiment of the present disclosure.

Results illustrated in FIG. 6 show the same defect using both an inspection method of a comparative example and an inspection method in accordance with an exemplary embodiment of the present invention. With reference to FIG. 6, it can be confirmed that, in the case of the exemplary embodiment of the present disclosure, as compared with the comparative example, a measure of dispersion of a detection signal (e.g., a gray level difference value) is significantly lower. In the case of the comparative example, 1 σ is about 5.0, while, in the case of the exemplary embodiment of the present disclosure, 1 σ is about 2.0. Dispersion of the detection signal was improved by reducing the alignment error functioning as a factor causing dispersion of the detection signal. Repeatability and reproducibility of the inspection device was improved.

As set forth above, according to exemplary embodiment of the present disclosure, a method of inspecting a defect and a defect inspecting device, having improved repeatability and reproducibility, may be provided.

While exemplary embodiment of the present disclosure have been shown and described above, it will be apparent to those skilled in the art that modifications and variations could be made without departing from the scope of the present inventive concept.

What is claimed is:

1. A method of inspecting a defect in an inspection object, comprising:
generating a first reference image and a second reference image from design layout data pertaining to the inspection object;
obtaining a first inspection image and a second inspection image of the inspection object;
extracting a first coordinate offset by comparing the first inspection image with the first reference image;
extracting a second coordinate offset by comparing the second inspection image with the second reference image;
comparing the first inspection image with the second inspection image in a die-to-die manner using the first coordinate offset and the second coordinate offset; and
determining whether a defect is present in the second inspection image based on the comparison of the first and second inspection images.

2. The method of claim 1, wherein the comparing the first inspection image with the second inspection image comprises:
aligning the first inspection image and the second inspection image using an alignment offset extracted from the first coordinate offset and the second coordinate offset; and
extracting a gray level difference value from gray level data of the first inspection image and of the second inspection image.

3. The method of claim 2, wherein the determining, whether the defect is present includes comparing the gray level difference value with a predetermined threshold value.

4. The method of claim 1, wherein the obtaining the first inspection image and the second inspection image comprises:
mounting a photomask including a first die and a second die disposed adjacent to the first die;
aligning the photomask;
directing light onto the first die; and
directing light onto the second die.

5. The method of claim 4, wherein the first inspection image is obtained from a region of the first die, and the second inspection image is obtained from a region of the second die.

6. The method of claim 1, wherein the extracting the first coordinate offset by comparing the first inspection image with the first reference image comprises:
aligning the first inspection image and the first reference image and extracting a distance between a first vertex disposed on a bottom left of the first inspection image and a first reference vertex disposed on a bottom left of the first reference image.

7. The method of claim 1, wherein the extracting the second coordinate offset by comparing the second inspection image with the second reference image comprises:
aligning the second inspection image and the second reference image and extracting a distance between a first edge disposed on a bottom left of the second inspection image and a first reference edge disposed on a bottom left of the second reference image.

8. The method of claim 1, wherein the first reference image and the second reference image each include pixels smaller than pixels of the first inspection image and the second inspection image.

9. The method of claim 1, wherein the generating the first reference image and a second reference image comprises generating the first reference image by simulating design layout data; and generating the second reference image by repeatedly aligning the first reference image at a predetermined pitch value.

* * * * *